US008848921B2

(12) United States Patent
Tang et al.

(10) Patent No.: US 8,848,921 B2
(45) Date of Patent: Sep. 30, 2014

(54) GROUP KEY MANAGEMENT APPROACH BASED ON LINEAR GEOMETRY

(75) Inventors: Shaohua Tang, Guangdong (CN); Jintai Ding, Guangdong (CN); Guangdong Yang, Guangdong (CN); Yujun Liang, Guangdong (CN)

(73) Assignee: South China University of Technology (CN)

( * ) Notice: Subject to any disclaimer, the term of this patent is extended or adjusted under 35 U.S.C. 154(b) by 241 days.

(21) Appl. No.: 13/055,380

(22) PCT Filed: Dec. 24, 2009

(86) PCT No.: PCT/CN2009/975996
§ 371 (c)(1),
(2), (4) Date: Aug. 10, 2011

(87) PCT Pub. No.: WO2011/075902
PCT Pub. Date: Jun. 30, 2011

(65) Prior Publication Data
US 2012/0263303 A1    Oct. 18, 2012

(51) Int. Cl.
*H04L 29/06*  (2006.01)
*G06F 21/00*  (2013.01)
*H04L 9/08*  (2006.01)

(52) U.S. Cl.
CPC ........... *H04L 9/0833* (2013.01); *H04L 2209/08* (2013.01)
USPC ........................................................ 380/279

(58) Field of Classification Search
CPC ................ H04L 63/065; H04L 9/0833; H04L 2209/601

USPC .......................................................... 380/279
See application file for complete search history.

(56) References Cited

U.S. PATENT DOCUMENTS

2001/0014156 A1 * 8/2001 Murakami .................... 380/277
2013/0058479 A1 * 3/2013 Tang et al. ...................... 380/46

* cited by examiner

*Primary Examiner* — Lisa Lewis
(74) *Attorney, Agent, or Firm* — Seyfarth Shaw LLP (57) ABSTRACT

A group key management approach based on linear geometry is disclosed. The approach includes the following steps: step 1: a group controller selects a mapping f and a finite field F; each group member selects a m-dimensional private vector over the finite field F, and sends it to the group controller via secure channel; step 2: the group controller selects a mapping parameter in the finite field F randomly, and maps the private vectors of all the group members into a new set of vectors by using the mapping f according to the mapping parameter; step 3: the group controller selects a random number k in the finite field F as a group key, and constructs a system of linear equations by using the new set of vectors and the group key; the group controller computes the central vector, and sends the central vector and the mapping parameter to all the group members via open channel; step 4: after the group members receive the central vector and the mapping parameter, the private vector of each group member is mapped to a new vector in a vector space according to the mapping parameter, and the group key is obtained by calculating the inner product of the new vector and the central vector. This invention requires small memory and little computation, has high security property, and is effective against brute-force attacks.

10 Claims, 6 Drawing Sheets

$U1: \quad \boxed{x_{1,0} = f(v_{1,0}, r), x_{1,1} = f(v_{1,1}, r)} \Longrightarrow \boxed{k = x_{1,0}a_0 + x_{1,1}a_1}$ $U2: \quad \boxed{x_{2,0} = f(v_{2,0}, r), x_{2,2} = f(v_{2,1}, r)} \Longrightarrow \boxed{k = x_{2,0}a_0 + x_{2,2}a_2}$ $U3: \quad \boxed{x_{3,0} = f(v_{3,0}, r), x_{3,3} = f(v_{3,1}, r)} \Longrightarrow \boxed{k = x_{3,0}a_0 + x_{3,3}a_3}$

GROUP KEY MANAGEMENT APPROACH BASED ON LINEAR GEOMETRY

FIELD OF THE INVENTION

The present invention relates to the field of group key management in network security technology, and in particular to a group key management approach based on linear geometry.

BACKGROUND OF THE INVENTION

With the rapid development of Internet technology and the popularization of multicast, group-oriented applications, such as video conference, network games, and video on demand, etc., play more and more important roles. How to protect the communication security of these applications is a critical problem. A secure group communication system should not only provide data confidentiality, user authentication, and information integrity, but also good scalability. For a secure group communication system, a secure, efficient, and robust group key management approach is essential.

These days, there are various approaches in key management of the secure group communication. The typical schemes are for example Group Key Management Protocol (GKMP), Secure Lock (SL), Logical Key Hierarchy (LKH), etc.

Group Key Management Protocol (GKMP) is a scheme that extends directly from unicast to multicast communication. In this scheme, it is assumed that a secure channel exists between the Group Controller (GC) and each group member. Initially, the GC selects a group key $K_0$ and distributes this key to all group members via the secure channel. When a new member joins, the GC selects a new group key $K_N$, and encrypts the new group key with the old group key to obtain $K'=E_{K_N}(K_0)$, then broadcasts $K'$ to the entire group. Moreover, the GC sends $K_N$ to the joining new member via the secure channel between the GC and the new member. Obviously, this scheme is not scalable, and there is no solution to keep the forward secrecy property when a member leaves the group, except to recreate an entirely new group without containing that member.

The Secure Lock (SL) scheme takes advantage of Chinese Remainder Theorem (CRT) to construct a secure lock to combine all the re-keying messages into one when the group key is updated. However, the CRT is a time-consuming operation. The SL scheme is efficient only when the number of users in a group is small, since the time to compute the lock and the length of the lock (hence the transmission time) is proportional to the number of users.

The Logical Key Hierarchy (LKH) scheme adopts tree structure to organize keys. The GC maintains a virtual tree, and the nodes in the tree are assigned keys. The key held by the root of the tree is the group key. The internal nodes of the tree hold key encryption keys (KEK). Keys at leaf nodes are possessed by different members. Each member is assigned the keys along the path from its leaf to the root. When a member joins or leaves the group, its parent node's KEK and all KEKs held by nodes in the path to the root should be changed. Therefore, the number of keys which need to be changed for a joining or leaving is $O(2 \times \log_2 n)$, and the number of encryptions is $O(2 \times \log_2 n)$. If a great deal of members join or leave the group, then the re-keying overhead will increase proportionally to the number of members changed. In addition, there are some other schemes that adopt tree structures, for example, OFT (One-way Function Tree), OFCT (One-way Function Chain Tree), Hierarchical a-ary Tree with Clustering, Efficent Large-Group Key, etc. These schemes are similar to the LKH or can be regarded as improvements to the LKH.

SUMMARY OF THE INVENTION

It is a first object of the present invention to provide a group key management approach based on linear geometry, which requires small memory and little computation, and is effective against brute-force attacks.

It is a second object of the present invention to provide a further group key management approach based on linear geometry, which requires small memory and little computation, has high security property, and is effective against brute-force attacks.

The first object of the present invention is achieved by the following technical solution:

a group key management approach based on linear geometry comprises the following steps:

step 1: a group controller selects a mapping f and a finite field F for use by a group (all computations in the group are performed over the finite field); suppose there are n members in the group, each group member selects a m-dimensional private vector over the finite field F, and sends the m-dimensional private vector to the group controller via secure channel; the group controller assigns and sends a serial number to each member, and receives the m-dimensional private vector of each member and keeps secret; wherein m, n are positive integers, and $2 \leq m \leq n$;

step 2: the group controller selects a mapping parameter in the finite field F randomly, and maps private vectors of all the members into a new set of vectors via the mapping f according to the mapping parameter, if the set of vectors is linearly dependent, then the mapping parameter is reselected to perform remapping, or return to the step 1 to make each member reselect a private vector, until the new set of vectors is linearly independent;

step 3: the group controller selects a random number in the finite field F as a group key, and constructs a system of linear equations by using the new set of vectors and the group key; the group controller computes the unique solution of the system of linear equations which is called central vector, and the central vector and the mapping parameter are broadcasted or multicasted by the group controller to all the group members via open channel;

step 4: after the group members receive the central vector and the mapping parameter, the private vector of each group member is mapped to a new vector in the vector space according to the mapping parameter, and the group key is obtained by calculating the inner product of the new vector and the central vector.

Preferably, the step 1 is implemented by the following:

the group controller selects a mapping f and a finite field F for use by a group; each member selects a m-dimensional private vector over the finite field F, and sends the m-dimensional private vector to the group controller via secure channel; wherein m is a positive integer, and $2 \leq m \leq n$;

the group controller assigns and sends a serial number $u_i$ to each member, and receives the m-dimensional private vector $V_i=(v_{i,1}, v_{i,2}, \ldots, v_{i,m})$ of each member and keeps secret, wherein $i=1, \ldots, n$;

the step 2 is implemented by the following:

the group controller selects a mapping parameter r in the finite field F randomly, and maps private vectors $V_i=(v_{i,1}, v_{i,2}, \ldots, v_{i,m})$ of all the members $u_i$ into a new set of vectors via the mapping f according to the mapping parameter r:

for each member $u_i$, where i=1,2, ..., m:

$$x_{i,1} = f(v_{i,1}, r)$$
$$x_{i,2} = f(v_{i,2}, r)$$
$$...$$
$$x_{i,m} = f(v_{i,m}, r)$$

for each member $u_i$, where i=m+1, ..., n:

$$x_{i,1} = f(v_{i,1}, r)$$
$$x_{i,i-m+2} = f(v_{i,2}, r)$$
$$...$$
$$x_{i,i} = f(v_{i,m}, r)$$

in this way, the group controller obtains a new set of vectors over the finite field F:
for each member $u_i$, where i=1,2, ..., m:

$X_i=(x_{i,1},x_{i,2},...,x_{i,n})$, wherein $x_{i,m+1},...,x_{i,n}$ are all 0;

for each member $u_i$, where i=m+1, ..., n:

$X_i=(x_{i,1},x_{i,2},...,x_{i,n})$, wherein $x_{i,2},...,x_{i,i-m+1}$ and $x_{i,i+1},...,x_{i,n}$ are all 0;

the group controller judges whether $X_1, X_2 ..., X_n$ are linearly independent, and if they are linearly independent, then proceed to the step 3; otherwise, return to the step 2, or return to the step 1 to allow the group member to reselect a private vector; (since r is a random number, it is easily to obtain a set of vectors $X_1, X_2 ..., X_n$ that are linearly independent);

the step 3 is implemented by the following:
the group controller selects a random number K in the finite field F as a group key, and constructs a system of linear equations by using the new set of vectors and the group key:
suppose $a_1, a_2, ..., a_n$ are unknown parameters, and the group controller solves the central vector $A=(a_1, a_2, ..., a_n)$ from the following system of linear equations:

$$\begin{cases} x_{1,1}a_1 + x_{1,2}a_2 + ... + x_{1,n}a_n = k \\ x_{2,1}a_1 + x_{2,2}a_2 + ... + x_{2,n}a_n = k \\ ... \\ x_{n,1}a_1 + x_{n,2}a_2 + ... + x_{n,n}a_n = k \end{cases}$$

this system of linear equations can be represented in vector form: $X \times A^T = K^T$
wherein T represents the transpose of the matrix, the vector $K=(k,k,...k)$, the vector $A=(a_1, a_2, ..., a_n)$, and the matrix $$X = \begin{bmatrix} X_1 \\ X_2 \\ ... \\ X_n \end{bmatrix} = \begin{bmatrix} x_{1,1} & x_{1,2} & ... & x_{1,n} \\ x_{2,1} & x_{2,2} & ... & x_{2,n} \\ ... & ... & ... & ... \\ x_{n,1} & x_{n,2} & ... & x_{n,n} \end{bmatrix};$$

since $X_1, X_2 ..., X_n$ are linearly independent vectors and the determinant of the coefficient matrix $|X| \neq 0$, this system of linear equations has the unique solution.

the central vector $A=(a_1, a_2, ..., a_n)$ and the mapping parameter r are broadcasted or multicasted by the group controller to all the group members via open channel;
the step 4 is implemented by the following:
after the group members receive the central vector $A=(a_1, a_2, ..., a_n)$ and the mapping parameter r, the private vector of each group member $u_i$ is mapped to a new vector in the vector space according to the mapping parameter r:
for the group member $u_i$, where i=1,2, ..., m:

$$x_{i,1} = f(v_{i,1}, r)$$
$$x_{i,2} = f(v_{i,2}, r)$$
$$...$$
$$x_{i,m} = f(v_{i,m}, r)$$

that is to say:
$X_i=(x_{i,1}, x_{i,2}, ..., x_{i,n})$, wherein $x_{i,m+1}, ..., x_{i,n}$ are all 0;
for the member $u_i$, where i=m+1, ..., n:

$$x_{i,1} = f(v_{i,1}, r)$$
$$x_{i,i-m+2} = f(v_{i,2}, r)$$
$$...$$
$$x_{i,i} = f(v_{i,m}, r)$$

that is to say:
$X_i=(x_{i,1}, x_{i,2}, ..., x_{i,n})$, wherein $x_{i,2}, ..., x_{i,i-m+1}$ and $x_{i,i+1}, ..., x_{i,n}$ are all 0;
then the group member $u_i$ can calculate the group key k via the equation below, i.e. the inner product of the vector $X_i$ and the central vector $A=(a_1, a_2, ..., a_n)$ $k=X_i \times A^T = x_{i,1}a_1 + x_{i,2}a_2 + ... + x_{i,n}a_n$, wherein T is the transpose of the matrix;

when a new member joins in the group, the group key management approach based on linear geometry further includes:
step 5, when new members join in the group, each new member selects a m-dimensional private vector over the finite field F, and sends the m-dimensional private vector to the group controller via secure channel; the group controller assigns and sends a serial number to each new member, and receives the m-dimensional private vector of each new member and keeps secret;
repeat the steps 2 to 4.

When group members need to leave the group, the group key management approach based on linear geometry further includes:
step 5, when group members need to leave the group, each member that needs to leave the group applies to the group controller for leaving the group; the group controller deletes the private vectors of the leaving members, and reassigns serial numbers for the remaining members according to the size order of the subscripts of the current members, and sends the serial numbers to all members via open channel;
repeat the steps 2 to 4.

When there are new members want to join in the group and members want to leave the group simultaneously, the group key management approach based on linear geometry further includes:
step 5, when there are new members want to join the group and members want to leave simultaneously, each new member selects a m-dimensional vector over the finite field F and sends the m-dimensional vector to the group controller via secure channel; the members want to leave the group apply to the group controller for leaving the group, and then the group controller deletes the private vector of each leaving member and reassigns serial numbers to the remaining members according to the size order of the subscripts of the current members, and assigns a serial number to each new member; the m-dimensional private vector of the new member is received by the group controller and kept secret; then the subscripts of all members are broadcasted to all members via open channel;

repeat the steps 2 to 4.

Preferably, the m-dimensional private vector is a two-dimensional private vector.

Preferably, the group key management approach based on linear geometry further includes auto update: if no member joins or leaves the group in a preset period, then the group controller will update the group key periodically, the group controller reselects the mapping parameter and the group key and calculates the central vector, and the central vector and the mapping parameter are broadcasted or multicasted to all members by the group controller via open channel.

Preferably, suppose the mapping f can be represented by $z=f(w,y)$, where $w,y,z \in F$, the main function of the mapping f is randomization, and the mapping f conforms to the following characteristics:

1) it is easy to calculate $z=f(w,y)$ if w, y are known;

2) it is difficult to calculate w if only z and y are known; if z and w are known, it is also difficult to compute y from $z=f(w,y)$; it is difficult to compute $w_i$ from $z_i=f(w_i, y_i)$, though a series of $z_i$ and $y_i$ is obtained; and it is also difficult to compute $y_i$ from $z_i=f(w_i, y_i)$, though a series of $z_i$ and $w_i$ is obtained.

The second object of the present invention is achieved by the following technical solution:

a group key management approach based on linear geometry comprises the following steps:

step 1: a group controller selects a mapping f and a finite field F for use by a group (all computations in the group are performed over the finite field); suppose there are n members in the group, each member selects a m-dimensional private vector over the finite field F, and sends the m-dimensional private vector to the group controller via secure channel; the group controller assigns and sends a serial number to each member, and receives the m-dimensional private vector of each member and keeps secret; wherein m, n are positive integers, and $2 \leq m \leq n+1$;

step 2: after the group controller receives the private vectors of all members, the group controller itself also selects a m-dimensional private vector, and the group controller selects a mapping parameter in the finite field F randomly, and maps the private vector of the group controller and the private vectors of all the members into a new set of vectors via the mapping f according to the mapping parameter; if the set of vectors is linearly dependent, then the mapping parameter is reselected to perform remapping, or return to step 1 to make each member reselect a private vector, until the new set of vectors is linearly independent;

step 3: the group controller selects a random number in the finite field F as a group key, and constructs a system of linear equations by using the new set of vectors and the group key; the group controller computes the unique solution of the system of linear equations which is called central vector, and the central vector and the mapping parameter are broadcasted or multicasted by the group controller to all the group members via open channel;

step 4: after the group members receive the central vector and the mapping parameter, the private vector of each group member is mapped to a new vector in the vector space according to the mapping parameter, and the group key is obtained by calculating the inner product of the new vector and the central vector.

Preferably, the step 1 is implemented by the following:

the group controller selects a mapping f and a finite field F for use by a group; each member selects a m-dimensional private vector over the finite field F, and sends the m-dimensional private vector to the group controller via secure channel; wherein m is a positive integer, and $2 \leq m \leq n+1$;

the group controller assigns and sends a serial number $U_i$ to each member, and receives the m-dimensional private vector $V_i=(v_{i,0}, v_{i,1}, \ldots, v_{i,m-1})$ of each member and keeps secret, wherein $i=1, \ldots, n$;

the step 2 is implemented by the following:

the group controller selects random numbers $v_{0,0}, v_{0,1}, \ldots, v_{0,m-1}$ in the finite field F, and constructs a m-dimensional private vector of itself $V_0=(v_{0,0}, v_{0,1}, \ldots, v_{0,m-1})$; the group controller selects a mapping parameter r in the finite field F, and maps private vectors $V_i=(v_{i,0}, v_{i,1}, \ldots, v_{i,m-1})$ of all the members $u_i$ and the m-dimensional private vector of itself $V_0=(v_{0,0}, v_{0,}, \ldots, v_{0,m-1})$ into a new set of vectors via the mapping f according to the mapping parameter r:

for the private vector of the group controller itself $V_0=(v_{0,0}, v_{0,1}, \ldots, v_{0,m-1})$, the group controller computes:

$$x_{0,0} = f(v_{0,0}, r)$$
$$x_{0,1} = f(v_{0,1}, r)$$
$$\ldots$$
$$x_{0,m-1} = f(v_{0,m-1}, r)$$

for the private vectors $V_i=(v_{i,0}, v_{i,1}, \ldots, v_{i,m-1})$ of the member $u_i$, where $i=1,2,\ldots, m-1$, the group controller computes:

$$x_{i,0} = f(v_{i,0}, r)$$
$$x_{i,1} = f(v_{i,1}, r)$$
$$\ldots$$
$$x_{i,m-1} = f(v_{i,m-1}, r)$$

for the private vectors $V_i=(v_{i,0}, v_{i,1}, \ldots, v_{i,m-1})$ of the member $u_i$, where $i=m, m+1, \ldots, n$, the group controller computes:

$$x_{i,0} = f(v_{i,0}, r)$$
$$x_{i,i-m+2} = f(v_{i,1}, r)$$
$$\ldots$$
$$x_{i,i} = f(v_{i,m-1}, r)$$

in this way, the group controller obtains a new set of vectors over the finite field F:

the new vector $X_0$ obtained after the mapping of the private vector of the group controller is:

$X_0=(x_{0,0}, x_{0,1}, \ldots, x_{0,n})$, wherein $x_{0,m}, \ldots, x_{0,n}$ are all 0;

for the new vector $X_i$ of the group member $u_i$, where $i=1, 2, \ldots, m-1$;

$X_i=(x_{i,0}, x_{i,1}, \ldots, x_{i,n})$, wherein $x_{i,m}, \ldots, x_{i,n}$ are all 0;

for the new vector $X_i$ of the group member $u_i$, where $i=m, m+1, \ldots, n$:

$X_i=(x_{i,0}, x_{i,1}, \ldots, x_{i,n})$, wherein $x_{i,1}, \ldots, x_{i,i-m+1}$ and $x_{i,i+1}, \ldots, x_{i,n}$ are all 0;

the group controller judges whether $X_0, X_1 \ldots, X_n$ are linearly independent, if they are linearly independent, then proceed to the step 3; otherwise, return to the step 2, or return to the step 1 to allow the group members to reselect private vectors; (since r is a random number, it is easily to obtain a set of vectors $X_0, X_1 \ldots, X_n$ that are linearly independent);

the step 3 is implemented by the following:

the group controller selects a random number K in the finite field F as a group key, and constructs a system of linear equations by using the new set of vectors and the group key:

suppose $a_1, a_2, \ldots, a_n$ are unknown parameters, and the group controller solves the central vector $A=(a_0, a_1, \ldots, a_n)$ from the following system of linear equations:

$$\begin{cases} x_{0,0}a_0 + x_{0,1}a_1 + \ldots + x_{0,n}a_n = k \\ x_{1,0}a_0 + x_{1,1}a_1 + \ldots + x_{1,n}a_n = k \\ \ldots \\ x_{n,0}a_0 + x_{n,1}a_1 + \ldots + x_{n,n}a_n = k \end{cases}$$

this system of linear equations is represented in vector form: $X \times A^T = K^T$ wherein the vector $K=(k, k, \ldots, k)$, the vector $A=(a_0, a_{h1}, \ldots, a_n)$, the matrix $$X = \begin{bmatrix} X_0 \\ X_1 \\ \ldots \\ X_n \end{bmatrix} = \begin{bmatrix} x_{0,0} & x_{0,1} & \ldots & x_{0,n} \\ x_{1,0} & x_{1,1} & \ldots & x_{1,n} \\ \ldots & \ldots & \ldots & \ldots \\ x_{n,0} & x_{n,1} & \ldots & x_{n,n} \end{bmatrix};$$

since $X_0, X_1 \ldots, X_n$ are linearly independent vectors and the determinant of the coefficient matrix $|X| \neq 0$, this linear system of linear equations has the unique solution;

the central vector $A=(a_0, a_1, \ldots, a_n)$ and the mapping parameter r are broadcasted or multicasted by the group controller to all the group members via open channel;

the step 4 is implemented by the following:

after the group members receive the central vector $A=(a_0, a_1 \ldots, a_n)$ and the mapping parameter r, the private vector of the group member is mapped to a new vector in the vector space according to the mapping parameter r:

for the group member $u_i$, where $i=1, 2, \ldots, m-1$:

$x_{i,0} = f(v_{i,0}, r)$ $x_{i,1} = f(v_{i,1}, r)$ $\ldots$ $x_{i,m-1} = f(v_{i,m-1}, r)$ that is to say:

$X_i=(x_{i,0}, x_{i,1}, \ldots, x_{i,n})$, wherein $x_{i,m}, \ldots, x_{i,n}$ are all 0;

for the group member $u_i$, where $i=m, m+1, \ldots, n$:

$x_{i,0} = f(v_{i,0}, r)$ $x_{i,i-m+2} = f(v_{i,1}, r)$ $\ldots$ $x_{i,i} = f(v_{i,m-1}, r)$ that is to say:

$X_i=(x_{i,0}, x_{i1}, \ldots, x_{i,n})$, wherein $x_{i,1}, \ldots, x_{i,i-m+1}$ and $x_{i,i+1}, \ldots, x_{i,n}$ are all 0;

then the group member $u_i$ can calculate the group key k via the equation below, i.e. the inner product of the vector $X_i$ and the central vector $A=(a_0, a_1, \ldots, a_n)$ $k = X_i \times A^T = x_{i,0}a_0 + x_{i,1}a_1 + \ldots + x_{i,n}a_n$ wherein $T$ is the transpose of the matrix;

when new members join the group, the group key management approach based on linear geometry further includes:

step 5, when new members join in the group, each new member selects a m-dimensional private vector in the finite field F, and sends the m-dimensional private vector to the group controller via secure channel; the group controller assigns and sends a serial number to each new member, and receives the m-dimensional private vector of each new member and keeps secret;

repeat the steps 2 to 4.

When group members need to leave the group, the group key management approach based on linear geometry further includes:

step 5, when group members need to leave the group, each member that needs to leave the group applies to the group controller for leaving the group; the group controller deletes the private vectors of the leaving members, and reassigns serial numbers for the remaining members according to the size order of the subscripts of the current members, and sends the serial numbers to all members via open channel;

repeat the steps 2 to 4.

When there are new members want to join in the group and members want to leave the group simultaneously, the group key management approach based on linear geometry further includes:

step 5, when new members want to join in the group and members want to leave simultaneously, each new member selects a m-dimensional vector in the finite field F and sends the m-dimensional vector to the group controller via secure channel; the members that want to leave the group apply to the group controller for leaving the group, and then the group controller deletes the private vector of each leaving member and reassigns serial numbers to the remaining members according to the size order of the subscripts of the current members, and assigns a serial number to each new member; the m-dimensional vector of the new member is received by the group controller and kept secret; then the subscripts of all members are broadcasted to all members via open channel;

repeat the steps 2 to 4.

Preferably, the m-dimensional private vector is a two-dimensional private vector.

Preferably, the group key management approach based on linear geometry further includes auto update: if no member joins or leaves the group in a preset period, then the group controller will update the group key periodically, the group controller reselects the mapping parameter and the group key and calculates the central vector, and the central vector and the mapping parameter are broadcasted or multicasted to all members by the group controller via open channel.

Preferably, suppose the mapping f can be represented by $z=f(w,y)$, where $w,y,z \in F$, the main function of the mapping f is randomization, and the mapping f conforms to the following characteristics:

1) it is easy to calculate $z=f(w,y)$ if w, y are known;

2) it is difficult to compute w if only z and y are known; if z and w are known, it is also difficult to compute y from $z=f(w,y)$; it is difficult to compute $w_i$ from $z_i=f(w_i, y_i)$, though a series of $z_i$ and $y_i$ is obtained; and it is also difficult to compute $y_i$ from $z_i=f(w_i, y_i)$, though a series of z, and w, is obtained.

Comparing with the prior art, the present invention has the following advantages:

Firstly, the storage of each member and the computation cost of the group controller are reduced. In the preferred scheme, if we fix m=2, each member needs to store only two-dimensional private vector of itself, that is to say, only 2 L bit storage space is required (L is the bit size of each element in the finite field F), and the computation cost of each member consists of mapping the private vector of itself to a new vector in the space according to the mapping parameter and computing the group key, and this includes two mapping operations, two multiplications and one addition over the finite field. It can be seen that the storage space and computation cost of each member is fixed, and will not increase as the group size increases. Moreover, the group controller needs to store the private vectors of the entire group, the storage space required is 2 nL (n is the quantity of the group members, and L is the bit size of each element in the finite field), and the main computation of the group controller is to compute the central vector; because the coefficient matrix is sparse and can be easily converted into a triangle matrix, the computation is very easy accordingly. Therefore, the computation cost and the storage space of the group controller increases linearly only as the group grows.

Secondly, the computation of the group controller can be easily parallelized. If the group controller operates on a multi-core processor platform, then it is very easy to enable the computation of the group controller to be parallel by using the current popular parallel computing library, which takes the advantage of the multi-core processor.

Thirdly, the secure channel is required only when a group member registers for the first time and a new member joins the group, and in other situations, only the open channel is required. This is because during the initialization of the group, the private vector is sent by the group member to the group controller via the secure channel, and at this time, the group has not yet been established, the secure channel is needed in order to ensure the security of the private vector. After then, the group controller only needs to send the central vector A and the mapping parameter r to all the group members, and because the vector A and r are both public, it is not necessary to keep secret, the secure channel is not required, and the open channel can be used for broadcasting and multicasting.

Fourthly, the method of the present invention is independent of other cryptography methods. The security of the present invention is based on the linear geometry theory over the finite field, only simple mapping operation and basic operation over the finite field is used during the process of computing the group key, and it does not rely on other traditional cryptography methods including asymmetric cryptography, symmetric cryptography, and hash function. In this way, the possibility that the present invention is attacked by other aspects is reduced. Even if the traditional cryptography methods are broken, the security provided by the present invention will not be affected.

Fifthly, forward and backward secrecy is provided. The group key k is randomly selected, and k will be changed each time the group members join or leave. Even if the group key is exposed for a period of time, non-members will not know the group key for the next time period. Therefore, the forward and backward secrecy can be guaranteed.

Sixthly, the attack from the group members or non-members can be effectively avoided. The group key k is obtained by computing the inner product of the private vector $X_i$ of the group member and the central vector A published by the group, while $X_i$ is generated by the mapping f by using the private vector $V_i$ of the group member and the mapping parameter r. For any non-member, $X_i$ is unable to be computed if the private vector $V_i$ is illegitimate, and thus the group key k can not be obtained. Any group member or non-member can not derive the private vector of other group members, since the private vector of each group member is sent to the group controller via the secure channel. Therefore, any non-member or other group members can not derive the private vector of the group member.

Finally, brute force attack to explore the group key is extremely difficult: the group key k is randomly selected from the finite field F. As long as the number of elements in the field is greater than a certain constant, e.g. $2^{128}$, then it will be very difficult to explore the group key by brute force attack.

DETAILED DESCRIPTION OF THE PREFERRED EMBODIMENTS

The invention will be further described in detail in the following embodiments accompanying the drawings. It will nevertheless be understood that no limitation of the scope of the invention is thereby intended.

Embodiment 1

Figure 1:
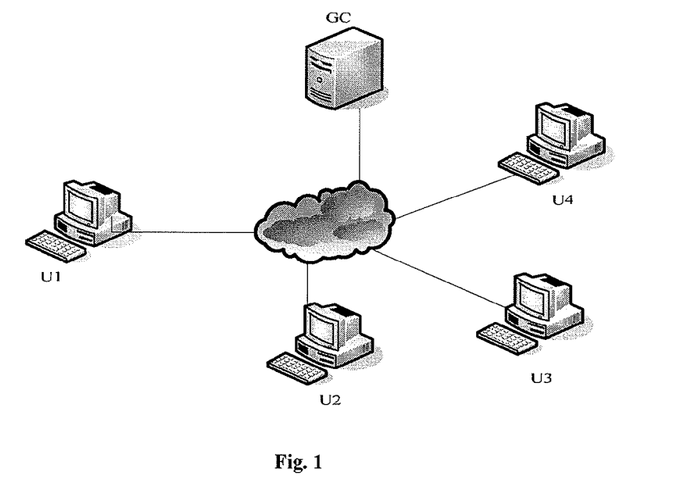
FIG. 1 is a schematic diagram of a secure group communication system according to a first embodiment of the present invention.

Referring to FIG. 1, a typical secure group communication system includes a group controller (GC) and four group users U1, U2, U3 and U4. The group controller is connected to each user via interne.

Figure 2:
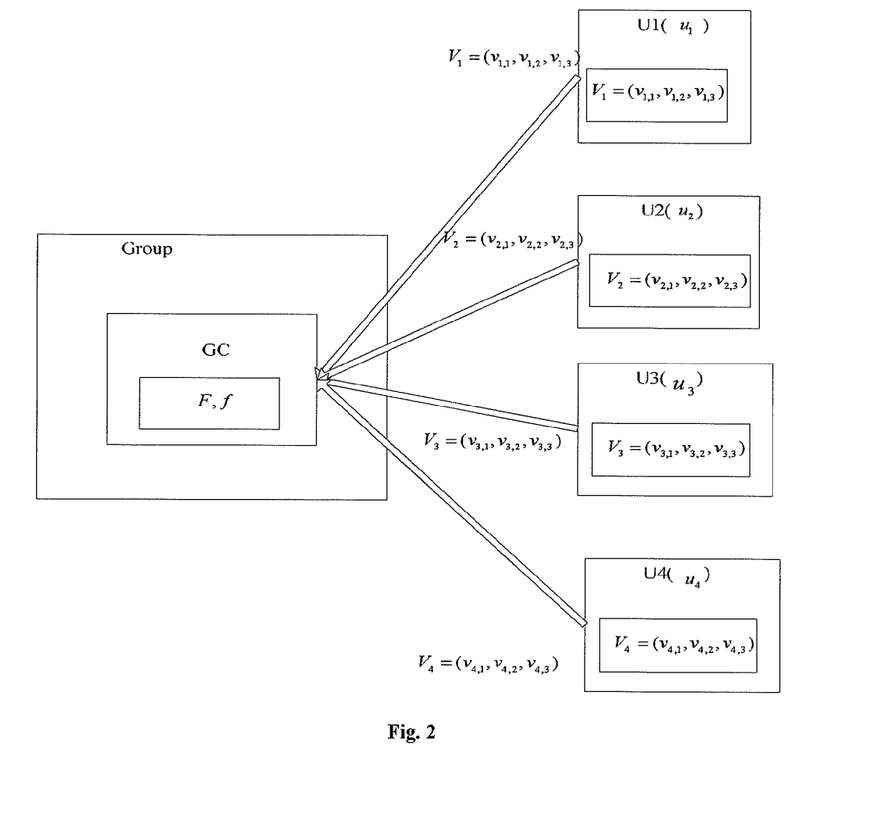
FIG. 2 is a schematic diagram showing that the group controller selects the finite field and the mapping f for the group use, and each group member sends the private vector to the group controller, according to the first embodiment.

As shown in FIG. 2, during the initialization of the group, the group controller selects a mapping f and a finite field F for use by the group, all computations in the group are performed over the finite field, and the mapping f uses a pseudo random number generator.

step 1, group members U1, U2, U3, U4 want to join the group, the group member U1 selects three private random numbers $v_{1,1}, v_{1,2}, v_{1,3} \in F$ in the finite field F and constructs the three-dimensional vector $V_1=(v_{1,1}, v_{1,2}, v_{1,3})$, the group member U2 also selects three private random numbers $v_{2,1}, v_{2,2}, v_{2,3} \in F$ and constructs the three-dimensional vector $V_2=(v_{2,1}, v_{2,2}, v_{2,3})$, the group member U3 also selects three private random numbers $v_{3,1}, v_{3,2}, v_{3,3} \in F$ and constructs the three-dimensional vector $V_3=(v_{3,1}, v_{3,2}, v_{3,3})$, and the group member U4 also selects three private random numbers $v_{4,1}, v_{4,2}, v_{4,3} \in F$ and constructs the three-dimensional vector $V_4=(v_{4,1}, v_{4,2}, v_{4,3})$. The group members U1, U2, U3 and U4 send the vectors $V_1=(v_{1,1}, v_{1,2}, v_{1,3}), V_2=(v_{2,1}, v_{2,2}, v_{2,3}), V_3=(v_{3,1}, v_{3,2}, v_{3,3})$ and $V_4=(v_{4,1}, v_{4,2}, v_{4,3})$ to the group controller.

The group controller assigns the serial number $u_1$ to the group member U1, the serial number $u_2$ to the group member U2, the serial number $u_3$ to the group member U3, and the serial number $u_4$ to the group member U4. The group controller sends these serial numbers to the corresponding group members via secure channel, and receives the three-dimensional private vector $V_i=(v_{i,1}, v_{i,2}, v_{i,3})$ of each group member and keeps secret, wherein i=1,2,3,4.

Figure 3:
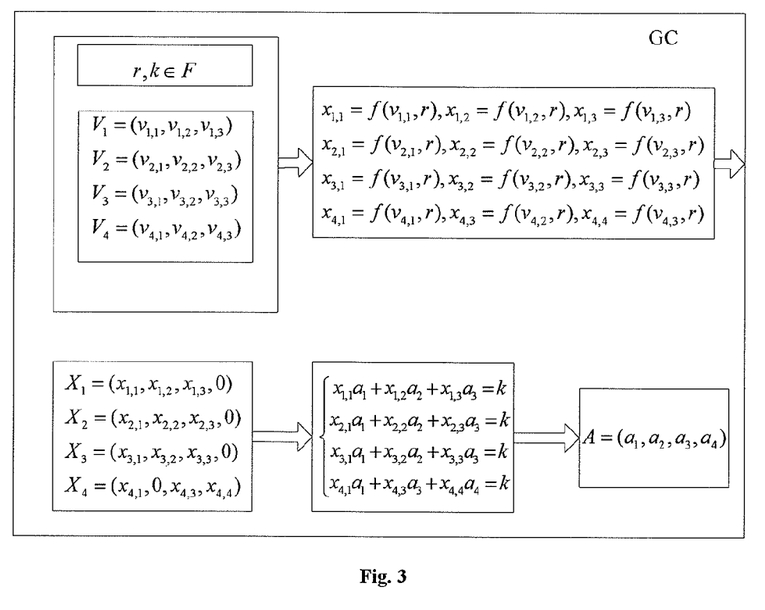
FIG. 3 is a schematic diagram showing that the group controller computes the central vector through the mapping parameter and the group key, according to the first embodiment.

Step 2, as shown in FIG. 3, the group controller (GC) receives the private vectors $V_1, V_2, V_3, V_4$ of the group members U1, U2, U3 and U4, and selects a random number r in the finite field F as the mapping parameter, and maps the three-dimensional private vectors $V_i=(v_{i,1}, v_{i,2}, v_{i,3})$ of all the members $u_i$ into a new set of vectors via the mapping f:

for each member $u_i$ (i=1,2,3), the group controller computes:

$$x_{1,1}=f(v_{1,1},r)$$

$$x_{1,2}=f(v_{1,2},r)$$

$$x_{1,3}=f(v_{1,3},r)$$

$$x_{2,1}=f(v_{2,1},r)$$

$$x_{2,2}=f(v_{2,2},r)$$

$$x_{2,3}=f(v_{2,3},r)$$

$$x_{3,1}=f(v_{3,1},r)$$

$$x_{3,2}=f(v_{3,2},r)$$

$$x_{3,3}=f(v_{3,3},r)$$

for each member $u_i$, where i=4, the group controller computes:

$$x_{4,1}=f(v_{4,1},r)$$

$$x_{4,3}=f(v_{4,2},r)$$

$$x_{4,4}=f(v_{4,3},r)$$

in this way, the group controller obtains a new set of vectors over the finite field F:

for the new vector $X_1$ of the group member $u_i$ (where i=1, 2, 3):

$$X_i=(x_{i,1},x_{i,2},x_{i,3},0), \text{ wherein } x_{i,4} \text{ is } 0;$$

for the new vector $X_4$ of the group member $u_4$:

$$X_4=(x_{4,1},0,x_{4,3},x_{4,4})$$

The group controller judges whether $X_1, X_2, X_3, X_4$ are linearly independent, and if they are independent, then proceed to the step 3, otherwise, return to the step 2. Since r is a random number, it is easy to obtain a set of vectors $X_1, X_2, X_3, X_4$ that are linearly independent.

Step 3, the group controller selects a random number $k \in F$ as a group key, and constructs a system of linear equations by using the new set of vectors and the group key:

suppose $a_1, a_2, a_3, a_4$ are unknown parameters, and the group controller computes the central vector $A=(a_1, a_2, a_3, a_4)$ from the following system of linear equations:

$$\begin{cases} x_{1,1}a_1 + x_{1,2}a_2 + x_{1,3}a_3 = k \\ x_{2,1}a_1 + x_{2,2}a_2 + x_{2,3}a_3 = k \\ x_{3,1}a_1 + x_{3,2}a_2 + x_{3,3}a_3 = k \\ x_{4,1}a_1 + x_{4,3}a_3 + x_{4,4}a_4 = k \end{cases}$$

this system of linear equations is represented in vector form: $X \times A^T = K^T$ wherein the vector $K=(k,k,k,k)$, $A=(a_1, a_2, a_3, a_4)$, the matrix $$X = \begin{bmatrix} X_1 \\ X_2 \\ X_3 \\ X_n \end{bmatrix} = \begin{bmatrix} x_{1,1} & x_{1,2} & x_{1,3} & 0 \\ x_{2,1} & x_{2,2} & x_{2,3} & 0 \\ x_{3,1} & x_{3,2} & x_{3,3} & 0 \\ x_{4,1} & 0 & x_{4,3} & x_{4,4} \end{bmatrix}$$

since the determinant of the coefficient matrix $|X| \neq 0$, this linear system of linear equations has the unique solution $A=(a_1, a_2, a_3, a_4)$, and $A=(a_1, a_2, a_3, a_4)$ is the central vector.

Figure 4:
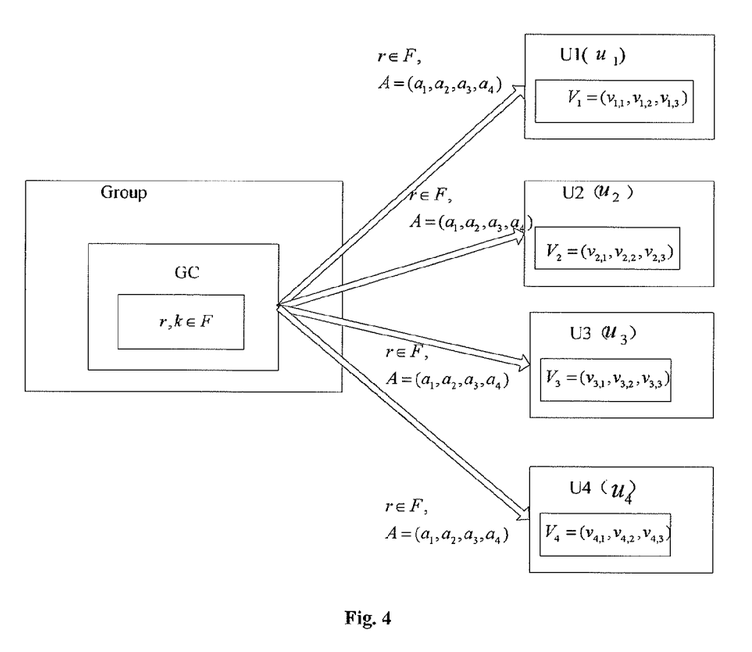
FIG. 4 is a schematic diagram showing that the group controller sends the mapping parameter and the central vector to the group members, according to the first embodiment.

As shown in FIG. 4, the group controller broadcasts the central vector $A=(a_1, a_2, a_3, a_4)$ and the mapping parameter r to the group members U1, U2, U3, U4 via open channel.

Figure 5:
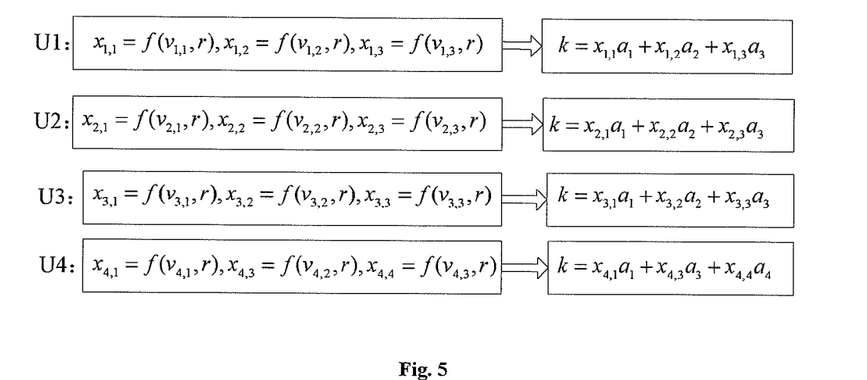
FIG. 5 is a schematic diagram showing that the group members compute the mapping parameter and the central vector, according to the first embodiment.

Step 4, as shown in FIG. 5, after the group members U1, U2, U3 and U4 receive the central vector $A=(a_1, a_2, a_3, a_4)$ and the mapping parameter r, a new vector is computed according to the mapping parameter r:

for the group member $u_i$ (i=1, 2, 3):

$$x_{1,1}=f(v_{1,1},r)$$

$$x_{1,2}=f(v_{1,2},r)$$

$x_{1,3}=f(v_{1,3},r)$ $x_{2,1}=f(v_{2,1},r)$ $x_{2,2}=f(v_{2,2},r)$ $x_{2,3}=f(v_{2,3},r)$ $x_{3,1}=f(v_{3,1},r)$ $x_{3,2}=f(v_{3,2},r)$ $x_{3,3}=f(v_{3,3},r)$ for the group member $u_i$, where i=4:

$x_{4,1}=f(v_{4,1},r)$ $x_{4,3}=f(v_{4,2},r)$ $x_{4,4}=f(v_{4,3},r)$ then, U1 calculates the group key $k=x_{1,1}a_1+x_{1,2}a_2+x_{1,3}a_3$, U2 calculates the group key $k=x_{2,1}a_1+x_{2,2}a_2+x_{2,3}a_3$, U3 calculates the group key $k=x_{3,1}a_1+x_{3,2}a_2+x_{3,3}a_3$, U4 calculates the group key $k=x_{4,1}a_1+x_{4,3}a_3+x_{4,4}a_4$, the calculated result k of the U1 is identical to the calculated results k of the U2, U3 and U4.

Figure 6:
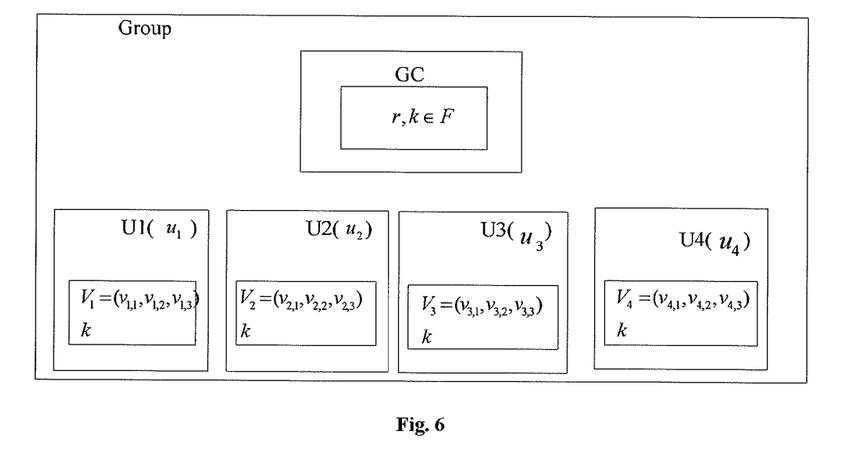
FIG. 6 is a schematic diagram showing that the group controller and the group members form the group, according to the first embodiment.

As shown in FIG. 6, after the above steps, a group with the group members U1, U2, U3 and U4 is established.

If no member joins or leaves the group in a preset period, then the group controller will update the group key periodically, i.e. repeat the step 2 to step 4.

Embodiment 2

Suppose the secure group communication system includes a group controller (GC) and five group users U1, U2, U3, U4 and U5. The group controller is connected to each user via internet. During the initialization of the group, the group controller selects a mapping f and a finite field F for use by the group, all computations in the group are performed over the finite field, and the mapping f uses a pseudo random number generator.

Step 1, the group member U4 applies to the group controller for leaving the group;

the group controller deletes the private vector $V_4$ of the leaving member, and reassigns serial numbers $u_i$ for the remaining members according to the size order of the subscripts of the current members, wherein i=1,2,3,4; the group controller sends the serial numbers to all members via open channel, and the private vectors of the group members currently stored by the group controller are $V_1, V_2, V_3, V_4$;

Other steps are identical to the steps 2 to 4 of the Embodiment 1.

Embodiment 3

Suppose the secure group communication system includes a group controller (GC) and two group users U1 and U2. The group controller is connected to each user via internet. During the initialization of the group, the group controller selects a mapping f and a finite field F for use by the group, all computations in the group are performed over the finite field, and the mapping f uses a pseudo random number generator.

Step 1, group members U3, U4 want to join the group, the group member U3 selects three private random numbers $v_{3,1}, v_{3,2}, v_{3,3} \in F$ and constructs the three-dimensional vector $V_3=(v_{3,1}, v_{3,2}, v_{3,3})$, and sends the vector $V_3=(v_{3,1}, v_{3,2}, v_{3,3})$ to the group controller via secure channel; the group member U4 also selects three private random numbers $v_{4,1}, v_{4,2}, v_{4,3} \in F$ and constructs the three-dimensional vector $V_4=(v_{4,1}, v_{4,2}, v_{4,3})$, and sends the vector $V_4=(v_{4,1}, v_{4,2}, v_{4,3})$ to the group controller via secure channel.

The group controller assigns the serial number $u_3$ to the group member U3, and sends the serial number $u_3$ to this group member, and receives the private vector $V_3=(v_{3,1}, v_{3,2}, v_{3,3})$ of this group member and keeps secret; the group controller assigns the serial number $u_4$ to the group member U4, and sends the serial number $u_4$ to this group member, and receives the private vector $V_4=(v_{4,1}, v_{4,2}, v_{4,3})$ of this group member and keeps secret; therefore, the private vectors currently stored by the group controller are $V_1, V_2, V_3, V_4$.

Other steps are identical to the steps 2 to 4 of the Embodiment 1.

Embodiment 4

Suppose the secure group communication system includes a group controller (GC) and three group users U1, U2 and U3. The group controller is connected to each user via interne.

During the initialization of the group, the group controller selects a mapping f and a finite field F for use by the group, all computations in the group are performed over the finite field, and the mapping f uses a pseudo random number generator.

Step 1, if the group member U2 wants to leave the group and the new group members U4 and U5 want to join the group, the new group members U4 and U5 select a three-dimensional vector respectively over the finite field F, and send the vectors to the group controller via secure channel.

The group controller deletes the private vector $V_2$ of the leaving member U2, and reassigns a subscript serial number i to allow the original group member U3 to be changed into $u_2$, and the corresponding vector is $V_2=(v_{2,1}, v_{2,2}, v_{2,3})$. The group controller assigns serial numbers $u_3$ and $u_4$ respectively to the new members U4 and U5, in this way, the U4 becomes $u_3$ in the group and the corresponding vector is $V_3=(v_{3,1}, v_{3,2}, v_{3,3})$, while the U5 becomes $u_4$ in the group and the corresponding vector is $V_4=(v_{4,1}, v_{4,2}, v_{4,3})$. The group controller sends the serial numbers to all members via open channel, and the private vectors of the group members currently stored by the group controller are $V_1, V_2, V_3, V_4$.

Other steps are identical to the steps 2 to 4 of the Embodiment 1.

Embodiment 5

Figure 7:
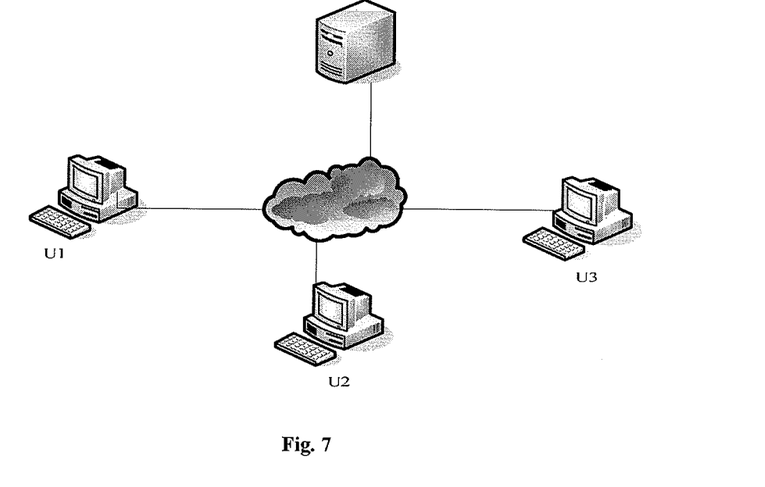
FIG. 7 is a schematic diagram showing a secure group communication system according to a fifth embodiment of the present invention.

Referring to FIG. 7, a typical secure group communication system includes a group controller (GC) and three group users U1, U2 and U3. The group controller is connected to each user via internet.

Figure 8:
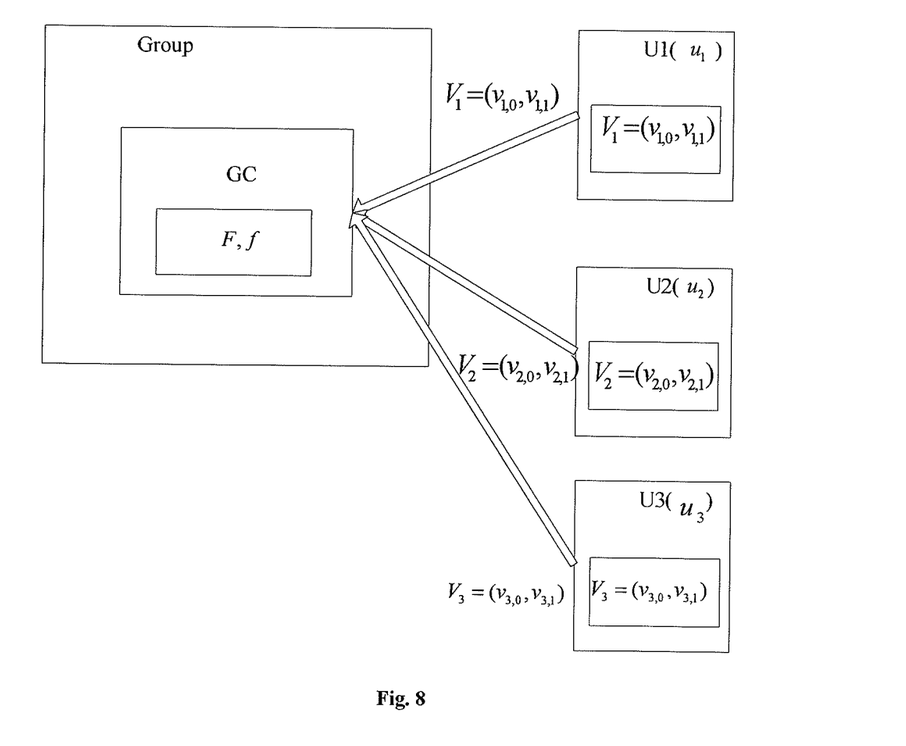
FIG. 8 is a schematic diagram showing that the group controller selects the finite field and the mapping f for the group use, and each group member sends the private vector to the group controller, according to the fifth embodiment.

As shown in FIG. 8, during the initialization of the group, the group controller selects a mapping f and a finite field F for use by the group, all computations in the group are performed over the finite field, and the mapping f uses a pseudo random number generator.

Step 1, group members U1, U3, U4 want to join the group, the group member U1 selects two private random numbers $v_{1,0}, v_{1,1} \in F$ and constructs the two-dimensional vector $V_1=(v_{1,0}, v_{1,1})$; the group member U2 also selects two private random numbers $v_{2,0}, v_{2,1} \in F$ and constructs the two-dimensional vector $V_2=(v_{2,0}, v_{2,1})$; and the group member U3 also selects two private random numbers $v_{3,0}, v_{3,1} \in F$ and constructs the two-dimensional vector $V_3=(v_{3,0}, v_{3,1})$. The U1, U2 and U3 send the vectors $V_1=(v_{1,0}, v_{1,1}), V_2=(v_{2,0}, v_{2,1})$, and $V_3=(v_{3,0}, v_{3,1})$ to the group controller via secure channel.

Figure 9:
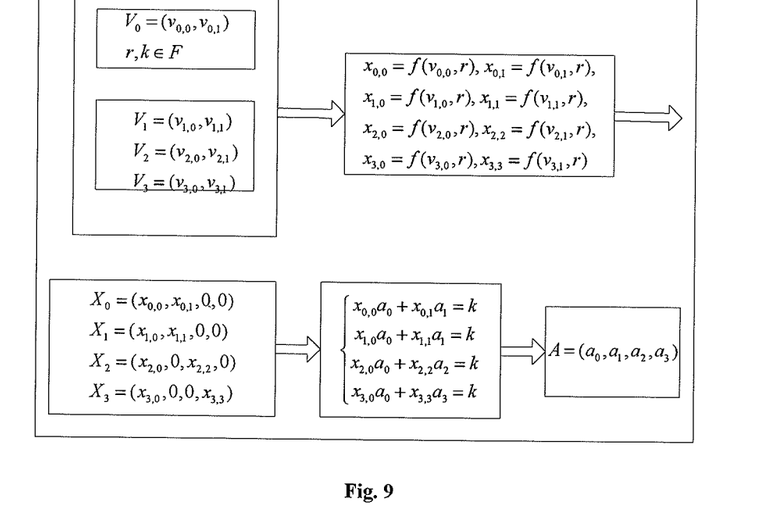
FIG. 9 is a schematic diagram showing that the group controller computes the central vector through the mapping parameter and the group key, according to the fifth embodiment.

The group controller assigns the serial number $u_1$ to the group member U1, the serial number $u_2$ to the group member U2, and the serial number $u_3$ to the group member U3; the group controller sends the above-mentioned serial numbers to the corresponding group members via secure channel, and receives the two-dimensional private vector $V_i=(v_{i,0}, v_{i,1})$ of each group member and keeps secret, wherein i=1,2,3;

Step 2, as shown in FIG. 9, after receiving the private vectors $V_1$, $V_2$, $V_3$ of the group members U1, U2 and U3, the group controller selects random numbers $v_{0,0}$, $v_{0,1}$, r∈F in the finite field F, wherein r is the mapping parameter, $v_{0,0}$, $v_{0,1}$ construct the private vector of the group controller $V_0=(v_{0,0}, v_{0,1})$ and $V_0$ is stored by the group controller.

The group controller maps the private vector of itself and the private vectors of all group members according to the mapping parameter to form a new set of vectors:

for the private vector $V_0=(v_{0,0}, v_{0,1})$ of the group controller itself, the group controller computes:

$$x_{0,0}=f(v_{0,0},r)$$

$$x_{0,1}=f(v_{0,1},r)$$

for the group member $u_i$ (i=1), the group controller computes:

$$x_{1,0}=f(v_{1,0},r)$$

$$x_{1,1}=f(v_{1,1},r)$$

the group controller judges whether $x_{0,0}x_{1,1}-x_{0,1}x_{1,o}=0$ is established, and if yes, then return to reselect the random numbers $v_{0,0}$, $v_{0,1}$, r∈F; if not, then proceed to the next step:

for the group member $u_i$ (where i=2, 3), the group controller computes:

$$x_{2,0}=f(v_{2,0},r)$$

$$x_{2,2}=f(v_{2,1},r)$$

$$x_{3,0}=f(v_{3,0},r)$$

$$x_{3,3}=f(v_{3,1},r)$$

in this way, the group controller obtains a new set of vectors over the finite vector F:

for the new vector $X_0$ obtained after the mapping of the private vector of the group controller:

$$X_0=(x_{0,0},x_{0,1},0,0)$$

for the new vector $X_1$ of the group member $u_1$:

$$X_1=(x_{1,0},x_{1,1},0,0)$$

for the new vector $X_i$ of the group member $u_i$, where i=2,3:

$$X_2=(x_{2,0},0,x_{2,2},0)$$

$$X_3=(x_{3,0},0,0,x_{3,3})$$

The group controller judges whether $X_0$, $X_1$, $X_2$, $X_3$ are linearly independent, and computes $|X|=(x_{0,0}x_{1,1}-x_{0,1}x_{1,0})x_{2,2}x_{3,3}$, and if it is not zero, then $X_0$, $X_1$, $X_2$, $X_3$ are linearly independent. If they are linearly dependent, then reselect the random numbers $v_{0,0}$, $v_{0,1}$, r∈F and compute $X_0$, $X_1$, $X_2$, $X_3$, otherwise, proceed to the next step. Since it meets the requirement of $x_{0,0}x_{1,1}-x_{0,1}x_{1,0}\neq 0$, as long as $x_{i,i}\neq 0$(i=2,3), then $|X|\neq 0$. Therefore, it is easy to obtain a set of vectors $X_0$, $X_1$, $X_2$, $X_3$ that are linearly independent according to the random number r and the mapping f.

Step 3, the group controller selects a random number k∈F as the group key. Suppose $a_0$, $a_1$, ..., $a_n$ are unknown variables, the group controller computes the central vector $A=(a_0, a_1, \ldots, a_n)$ from the following system of linear equations:

$$\begin{cases} x_{0,0}a_0 + x_{0,1}a_1 = k \\ x_{1,0}a_0 + x_{1,1}a_1 = k \\ x_{2,0}a_0 + x_{2,2}a_2 = k \\ x_{3,0}a_0 + x_{3,3}a_3 = k \end{cases}$$

this system of linear equations can be represented in vector form: $X \times A^T = K^T$ wherein the vector $K=(k,k,k,k)$, the vector $A=(a_0, a_1, a_2, a_3)$, the matrix $$X = \begin{bmatrix} X_0 \\ X_1 \\ X_2 \\ X_3 \end{bmatrix} = \begin{bmatrix} x_{0,0} & x_{0,1} & 0 & 0 \\ x_{1,0} & x_{1,1} & 0 & 0 \\ 0 & 0 & x_{2,2} & 0 \\ 0 & 0 & 0 & x_{3,3} \end{bmatrix}$$

Because the determinant of the coefficient matrix $|X|\neq 0$, this linear system of linear equations has the unique solution $A=(a_0, a_1, a_2, a_3)$, and $A=(a_0, a_1, a_2, a_3)$ is the central vector.

Figure 10:
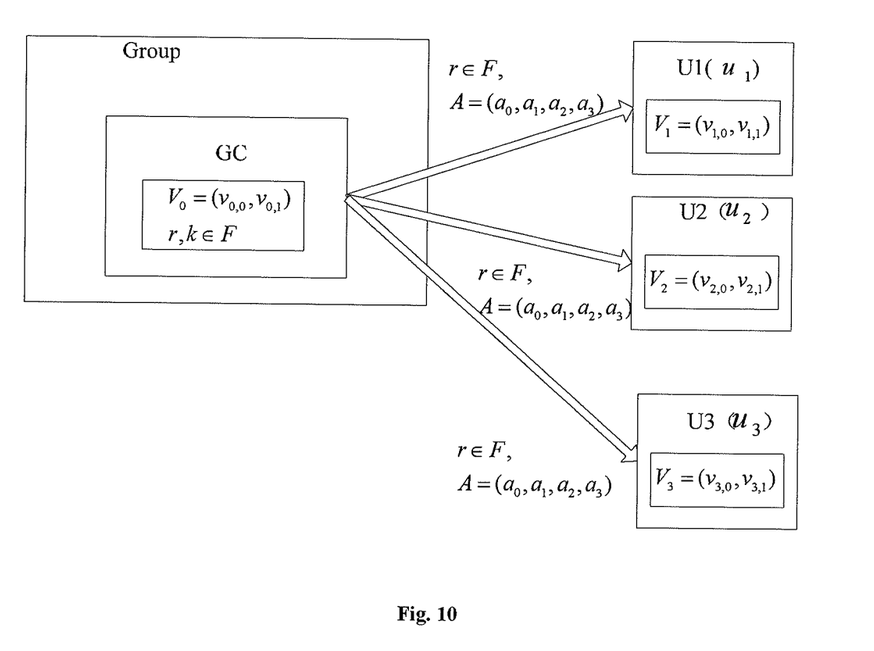
FIG. 10 is a schematic diagram showing that the group controller sends the mapping parameter and the central vector to the group members, according to the fifth embodiment.

As shown in FIG. 10, the group controller broadcasts the central vector $A=(a_0, a_1, a_2, a_3)$ and the mapping parameter r to the group members U1, U2 and U3 via open channel.

Figure 11:
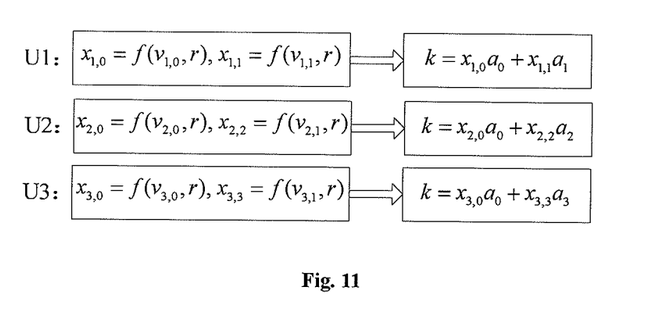
FIG. 11 is a schematic diagram showing that the group members compute the mapping parameter and the central vector, according to the fifth embodiment.

Step 4, as shown in FIG. 11, after the group members U1, U2 and U3 receive $A=(a_0, a_1, a_2, a_3)$ and the mapping parameter r, new vectors are computed according to the mapping parameter r:

$$x_{1,0}=f(v_{1,0},r)$$

$$x_{1,1}=f(v_{1,1},r)$$

$$x_{2,0}=f(v_{2,0},r)$$

$$x_{2,2}=f(v_{2,1},r)$$

$$x_{3,0}=f(v_{3,0},r)$$

$$x_{3,3}=f(v_{3,1},r)$$

then, the group member U1 computes the group key $k=x_{1,0}a_0+x_{1,1}a_1$, the group member U2 computes the group key $k=x_{2,0}a_0+x_{2,2}a_2$, the group member U3 computes the group key $k=x_{3,0}a_0+x_{3,3}a_3$. It is obvious that the group key k calculated by the group member U1 is identical to the group keys k calculated by the group members U2 and U3.

Figure 12:
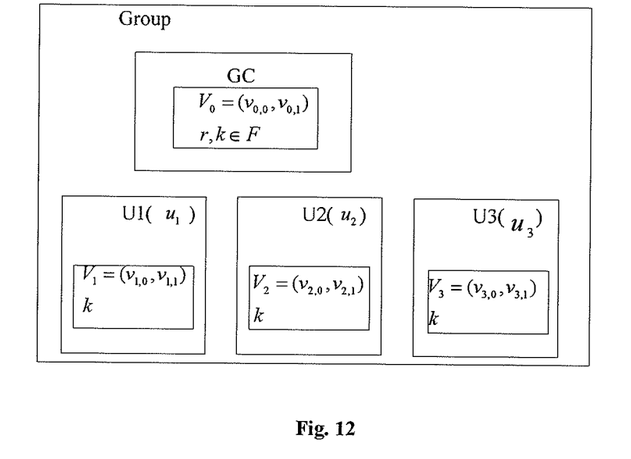
FIG. 12 is a schematic diagram showing that the group controller and the group members form the group, according to the fifth embodiment.

As shown in FIG. 12, a group with group members U1, U2 and U3 is established after the above steps.

If no member joins or leaves the group in a preset period, then the group controller will update the group key periodically, that is to say, repeat the steps 2 to 4.

Embodiment 6

Suppose the secure group communication system includes a group controller (GC) and four group users U1, U2, U3 and U4. The group controller is connected to each user via interne. During the initialization of the group, the group controller selects a mapping f and a finite field F for use by the group, all computations in the group are performed over the finite field, and the mapping f uses a pseudo random number generator.

Step 1, if the group member U4 applies to the group controller for leaving the group;

the group controller deletes the private vector $V_4$ of the leaving member, and reassigns serial number $u_i$ for the remaining members according to the size order of the subscripts of the current members, wherein i=1,2,3; the group controller sends the serial numbers to all members via open channel, and the private vectors of the group members currently stored by the group controller are $V_1, V_2, V_3$;

Other steps are identical to the steps 2 to 4 of the Embodiment 5.

Embodiment 7

Suppose the secure group communication system includes a group controller (GC) and two group users U1 and U2. The group controller is connected to each user via internet. During the initialization of the group, the group controller selects a mapping f and a finite field F for use by the group, all computations in the group are performed over the finite field, and the mapping f uses a pseudo random number generator.

Step 1, when a new group member U3 wants to join the group, the new group member U3 selects a private vector over the finite field F, and sends it to the group controller via secure channel The group controller assigns a serial number $u_3$ to the new group member U3 and sends the serial number to this group member, and then receives the private vector $V_3=(v_{3,0}, v_{3,1})$ of this group member and keeps secret. Therefore, the private vectors currently stored by the group controller store are $V_1, V_2, V_3$.

Other steps are identical to the steps 2 to 4 of the Embodiment 1.

Embodiment 8

Suppose the secure group communication system includes a group controller (GC) and three group users U1, U2 and U3. The group controller is connected to each user via internet.

During the initialization of the group, the group controller selects a mapping f and a finite field F for use by the group, all computations in the group are performed over the finite field, and the mapping f uses a pseudo random number generator.

Step 1, if the group member U2 wants to leave the group and a new group member U4 wants to join the group, the new group member U4 selects a two-dimensional vector over the finite field F, and sends the vector to the group controller via secure channel.

The group controller deletes the private vector $V_2$ of the leaving member U2, and reassigns a subscript serial number i to allow the original group member U3 to change into $u_2$, and the corresponding vector is $V_2=(v_{2,0}, v_{2,1})$. The group controller assigns serial numbers $u_3$ to the new member U4, in this way, the U4 becomes $u_3$ in the group and the corresponding vector is $V_3=(v_{3,0}, v_{3,1})$. The group controller sends the serial numbers to all members via open channel, and the private vectors of the group members currently stored by the group controller are $V_1, V_2, V_3$.

Other steps are identical to the steps 2 to 4 of the Embodiment 5.

It should be emphasized that the above-described embodiments can be combined freely. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A group key management method, comprising:
   selecting, by a group controller, a mapping field f and a finite field F for use by a group in communication with the group controller, wherein the group has n group members;
   receiving, by the group controller, a m-dimensional private vector from each group member via a secure channel;
   assigning and sending, by the group controller, a serial number to each group member, wherein m and n are positive integers, and 2≤m≤n;
   randomly selecting, by the group controller, a mapping parameter in the finite field F;
   mapping, by the group controller, the private vectors of all the group members into a new set of vectors in a vector space using the mapping f according to the mapping parameter, wherein if the set of vectors is linearly dependent the mapping parameter is reselected to perform remapping or the step of selecting is repeated to allow each group member to reselect a private vector, until the new set of vectors is linearly independent;
   selecting, by the group controller, a random number in the finite field F as a group key;
   constructing, by the group controller, a system of linear equations using the new set of vectors and the group key;
   computing, by the group controller, a unique solution of the system of linear equations defined as a central vector; and
   broadcasting or multicasting, by the group controller, the central vector and the mapping parameter to all the group members via an open channel,
   wherein after the group members receive the central vector and the mapping parameter, the private vector of each group member is mapped to a new vector in the vector space according to the mapping parameter, and the group key is obtained by calculating the inner product of the new vector and the central vector.

2. The group key management method of claim 1, further comprising:
   receiving, by the group controller, a m-dimensional private vector in the finite field F from a new group member via the secure channel;
   assigning and sending, by the group controller, a serial number to the new group member; and
   repeating the randomly selecting, mapping, selecting the random number, constructing, computing, and broadcasting or multicasting steps for the new group member.

3. The group key management method of claim 1, further comprising:
   receiving, by the group controller, an indication to leave the group from a leaving group member;
   deleting, by the group controller, the private vector of the leaving group member;
   reassigning, by the group controller, serial numbers for the remaining group members according to the size order of the subscripts of the current group members;
   sending, by the group controller, the reassigned serial numbers to all group members via the open channel; and
   repeating the randomly selecting, mapping, selecting the random number, constructing, computing, and broadcasting or multicasting steps.

4. The group key management method of claim 1, wherein:
   the serial number is defined as $u_i$, and the private vector of each group member is defined as $V_i=(v_{i,1}, v_{i,2}, \ldots, v_{i,m})$;
   the mapping parameter is defined as r, and for each group member $u_i$, where i=1, 2, ..., m:

$$x_{i,1} = f(v_{i,1}, r)$$
$$x_{i,2} = f(v_{i,2}, r)$$
$$\ldots$$
$$x_{i,m} = f(v_{i,m}, r)$$

and for each group member $u_i$, where i=m+1, ..., n:

$$x_{i,1} = f(v_{i,1}, r)$$
$$x_{i,i-m+2} = f(v_{i,2}, r)$$
$$\ldots$$
$$x_{i,i} = f(v_{i,m}, r)$$

allowing the group controller to obtain the new set of vectors in the finite field F:
for each group member $u_i$, where i=1, 2, ..., m:
$X_i = (x_{i,1}, x_{i,2}, \ldots, x_{i,n})$, wherein $x_{i,k+1}, \ldots, x_{i,n}$ are all 0; and
for each group member $u_i$, where i=m+1, ..., n
$X_i = (x_{i,1}, x_{i,2}, \ldots, x_{i,n})$, wherein $x_{i,2}, \ldots, x_{i,l-m+1}$ and $x_{i,l+1}, \ldots, x_{i,n}$ are all 0;
the random number is defined as k,
$a_1, a_2, \ldots, a_n$ are defined as unknown parameters, and the group controller computes the central vector $A = (a_1, a_2, \ldots, a_n)$ from the system of linear equations:

$$\begin{cases} x_{1,1}a_1 + x_{1,2}a_2 + \ldots + x_{1,n}a_n = k \\ x_{2,1}a_1 + x_{2,2}a_2 + \ldots + x_{2,n}a_n = k \\ \ldots \\ x_{n,1}a_1 + x_{n,2}a_2 + \ldots + x_{n,n}a_n = k, \end{cases}$$

the system of linear equations represented in vector form is: $X \times A^T = K^T$, wherein T represents a transpose of a matrix, $K = (k, k, k)$, $A = (a_1, a_2, \ldots, a_n)$, and the matrix $$X = \begin{bmatrix} X_1 \\ X_2 \\ \ldots \\ X_n \end{bmatrix} = \begin{bmatrix} x_{1,1} & x_{1,2} & \ldots & x_{1,n} \\ x_{2,1} & x_{2,2} & \ldots & x_{2,n} \\ \ldots & \ldots & \ldots & \ldots \\ x_{n,1} & x_{n,2} & \ldots & x_{n,n} \end{bmatrix};$$

wherein
$X_1, X_2, \ldots, X_n$ are linearly independent vectors and the determinant of the coefficient matrix $|X|$;
the private vector of each group member $u_i$ is expressed as:
for the group member $u_i$, where i=1,2, ..., m:

$$x_{i,1} = f(v_{i,1}, r)$$
$$x_{i,2} = f(v_{i,2}, r)$$
$$\ldots$$
$$x_{i,m} = f(v_{i,m}, r),$$

$X_i = (x_{i,1}, x_{i,2}, \ldots, x_{i,n})$, wherein, $\ldots, x_{i,n}$ are all 0;

for the group member $u_i$, wherein i=m+1, ..., n:

$$x_{i,1} = f(v_{i,1}, r)$$
$$x_{i,i-m+2} = f(v_{i,2}, r)$$
$$\ldots$$
$$x_{i,i} = f(v_{i,m}, r),$$

$X_i = (x_{i,1}, x_{i,2}, \ldots, x_{i,n})$, wherein $x_{i,2}, \ldots, x_{i,1-m+1}$ and $x_{i,1+1}, \ldots, x_{i,n}$ are all 0; and
the group key k is calculated by:
$k = X \times A^T = x_{i,1}a_1 + x_{i,2}a_2 + \ldots + x_{i,n}a_n$, wherein T is the transpose of the matrix.

5. A group key management method comprising:
selecting, by a group controller, a mapping f and a finite field F for use by a group in communication with the group controller, wherein the group has n group members;
receiving, by the group controller, a m-dimensional private vector over the finite field F from each group member, via a secure channel;
assigning and sending, by the group controller, a serial number to each group member, wherein m and n are positive integers, and $2 \leq m \leq n+1$;
selecting, by the group controller, a m-dimensional private vector for the group controller;
randomly selecting, by the group controller, a mapping parameter in the finite field F;
mapping, by the group controller, the private vector of the group controller and the private vectors of all the group members into a new set of vectors via the mapping f according to the mapping parameter, wherein if the set of vectors is linearly dependent, the mapping parameter is reselected to perform remapping or the step of selecting is repeated to make each group member reselect a private vector, until the new set of vectors is linearly independent;
selecting, by the group controller, a random number in the finite field F as a group key;
constructing, by the group controller, a system of linear equations using the new set of vectors and the group key;
computing, by the group controller, a unique solution of the system of linear equations called a central vector; and
broadcasting or multicasting, by the group controller, the central vector and the mapping parameter to all the group members via an open channel,
wherein, after the group members receive the central vector and the mapping parameter, the private vector of each group member is mapped to a new vector in the vector space according to the mapping parameter, and the group key is obtained by calculating the inner product of the new vector and the central vector.

6. The group key management method of claim 5, further comprising:
receiving, by the group controller, a m-dimensional private vector in the finite field F for a new group member, and via the secure channel;
assigning and sending, by the group controller, a serial number to the new group member; and
repeating the randomly selecting, mapping, selecting the random number, constructing, computing, and broadcasting or multicasting steps for the new group member.

7. The group key management method of claim 5, further comprising:
  receiving, by the group controller, an indication to leave the group from a leaving group member;
  deleting, by the group controller, the private vector of the leaving group member; and
  reassigning, by the group controller, serial numbers for the remaining group members according to the size order of the subscripts of the current group members;
  sending, by the group controller, the reassigned serial numbers to all group members via the open channel; and
  repeating the randomly selecting, mapping, selecting the random number, constructing, computing, and broadcasting or multicasting steps.

8. The group key management method of claim 5, wherein:
  the serial number is defined as $u_i$, and the private vector of each group member is defined as $V_i=(v_{i,1}, v_{i,2}, \ldots, v_{i,m})$:
  the group controller selects random numbers $v_{0,0}, v_{0,1}, \ldots, v_{0,m-1}$, in the finite field F, the m-dimensional private vector is defined as $V_0=(v_{0,0}, v_{0,1}, \ldots, v_{0,m-1})$, the mapping parameter is defined as r, and maps private vectors $V_i=(v_{i,0}, v_{i,1}, \ldots, v_{i,m-1})$ of all the group members $u_i$ and the m-dimensional private vector $V_0=(v_{0,0}, v_{0,1}, \ldots, v_{0,m-1})$ into a new set of vectors via the mapping f according to the mapping parameter r:
  for the private vector of the group controller $V_0=(v_{0,0}, v_{0,1}, \ldots, v_{0,m-1})$, the group controller computes:

$$x_{0,0} = f(v_{0,0}, r)$$
$$x_{0,1} = f(v_{0,1}, r)$$
$$\ldots$$
$$x_{0,m-1} = f(v_{0,m-1}, r)$$

for the private vectors $V_i=(v_{i,0}, v_{i,1}, \ldots, v_{i,m-1})$ of the group members $u_i$, where $i=1, 2, \ldots, m-1$, the group controller computes:

$$x_{i,0} = f(v_{i,0}, r)$$
$$x_{i,1} = f(v_{i,1}, r)$$
$$\ldots$$
$$x_{i,m-1} = f(v_{i,m-1}, r),$$

for the private vectors $V_i=(v_{i,0}, v_{i,1}, \ldots, v_{i,m-i})$ of the group members $u_i$, where $i=m, m+1, \ldots, n$, the group controller computes:

$$x_{i,0} = f(v_{i,0}, r)$$
$$x_{i,i-m+2} = f(v_{i,1}, r)$$
$$\ldots$$
$$x_{i,i} = f(v_{i,m-1}, r),$$

allowing the group controller to obtain the new set of vectors over the finite field F:
  the new vector $X_0$ obtained after the mapping of the private vector of the group controller is:
  $X_0=(x_{0,0}, x_{0,1}, \ldots, x_{0,n})$, wherein $x_{0,m}, \ldots, x_{0,n}$ are all 0;
  for the new vector $X_i$ of the group members $u_i$, where $i=1, 2, \ldots, m-1$:
  $X_i=(x_{i,0}, x_{i,1}, \ldots, x_{i,n})$, wherein $x_{i,m}, \ldots, x_{i,n}$ are all 0;
  for the new vector $X_i$ of the group member $u_i$, where $i=m, m+1, \ldots, n$:
  $X_i=(x_{i,0}, x_{i,1}, \ldots, x_{i,n})$, wherein $x_{i,1}, \ldots, x_{i,i-m+1}$ and $x_{i,i+1}, \ldots, x_{i,n}$ are all 0;
  the random number is defined as k,
  $a_0, a_1, \ldots, a_n$ are defined as unknown parameters, and the group controller solves the central vector $A=(a_0, a_1, \ldots, a_n)$ from the following system of linear equations:

$$\begin{cases} x_{0,0}a_0 + x_{0,1}a_1 + \ldots + x_{0,n}a_n = k \\ x_{1,0}a_0 + x_{1,1}a_1 + \ldots + x_{1,n}a_n = k \\ \ldots \\ x_{n,0}a_0 + x_{n,1}a_1 + \ldots + x_{n,n}a_n = k \end{cases}$$

the system of linear equations represented in vector form is: $X \times A^T = K^T$,
  wherein $K=(k, k, \ldots, k), A=(a_0, a_1, \ldots, a_n)$, and the matrix $$X = \begin{bmatrix} X_0 \\ X_1 \\ \ldots \\ X_n \end{bmatrix} = \begin{bmatrix} x_{0,0} & x_{0,1} & \ldots & x_{0,n} \\ x_{1,0} & x_{1,1} & \ldots & x_{1,n} \\ \ldots & \ldots & \ldots & \ldots \\ x_{n,0} & x_{n,1} & \ldots & x_{n,n} \end{bmatrix};$$

wherein
  $X_0, X_1, \ldots, X_n$ are linearly independent vectors and the determinant of the coefficient matrix |X|;
  the private vector of the group member is expressed as:
  for the group member $u_i$, where $i=1, 2, \ldots, m-1$:

$$x_{i,0} = f(v_{i,0}, r)$$
$$x_{i,1} = f(v_{i,1}, r)$$
$$\ldots$$
$$x_{i,m-1} = f(v_{i,m-1}, r),$$

$X_i=(x_{i,0}, x_{i,1}, \ldots, x_{i,n})$, wherein $x_{i,m}, \ldots, x_{i,n}$ are all 0;
  for the group member $u_i$, where $i=m, m+1, \ldots, n$:

$$x_{i,0} = f(v_{i,0}, r)$$
$$x_{i,i-m+2} = f(v_{i,1}, r)$$
$$\ldots$$
$$x_{i,i} = f(v_{i,m-1}, r)$$

$X_i=(x_{i,0}, x_{i,1}, \ldots, x_{i,n})$, wherein $x_{i,1}, \ldots, x_{i,i-m+1}$ and $x_{i,i+1}, \ldots, x_{i,n}$ are all 0; and
  the group key k is calculated by:
  $k=X_i \times A^T=x_{i,0}a_0+x_{i,1}a_1+\ldots+x_{i,n}a_n$, wherein T is the transpose of the matrix.

9. The group key management method of claim 1 or 5, wherein the m-dimensional private vector is a two-dimensional private vector.

10. The group key management method of claim 1 or 5, further comprising:

updating, by the group controller, the group key, periodically;

reselecting, by the group controller, the mapping parameter and the group key;

recomputing, by the group controller, the central vector; and broadcasting or multicasting the recomputed central vector and the reselected mapping parameter to all group members via the open channel.

* * * * *

UNITED STATES PATENT AND TRADEMARK OFFICE
CERTIFICATE OF CORRECTION

| | | |
|---|---|---|
| PATENT NO. | : 8,848,921 B2 | Page 1 of 1 |
| APPLICATION NO. | : 13/055380 | |
| DATED | : September 30, 2014 | |
| INVENTOR(S) | : Shaohua Tang et al. | |

It is certified that error appears in the above-identified patent and that said Letters Patent is hereby corrected as shown below:

On the Title Page

PCT No (86).:

PCT/CN2009/975996 should be "PCT/CN2009/075996".

Signed and Sealed this
Fifth Day of May, 2015

Michelle K. Lee
*Director of the United States Patent and Trademark Office*